(12) United States Patent
Özcan et al.

(10) Patent No.: US 9,970,113 B2
(45) Date of Patent: May 15, 2018

(54) METHOD FOR COATING METALLIC SURFACES WITH NANOCRYSTALLINE ZINC OXIDE LAYERS, AQUEOUS COMPOSITIONS THEREFOR AND USE OF THE SURFACES COATED IN THIS WAY

(71) Applicant: Chemetall GmbH, Frankfurt am Main (DE)

(72) Inventors: Özlem Özcan, Paderborn (DE); Guido Grundmeier, Paderborn (DE); Peter Schubach, Nidderau/Windecken (DE)

(73) Assignee: Chemetall GmbH, Frankfurt am Main (DE)

( * ) Notice: Subject to any disclaimer, the term of this patent is extended or adjusted under 35 U.S.C. 154(b) by 65 days.

(21) Appl. No.: 14/441,005

(22) PCT Filed: Nov. 13, 2013

(86) PCT No.: PCT/EP2013/073668
§ 371 (c)(1),
(2) Date: May 14, 2015

(87) PCT Pub. No.: WO2014/076105
PCT Pub. Date: May 22, 2014

(65) Prior Publication Data
US 2015/0284854 A1  Oct. 8, 2015

(30) Foreign Application Priority Data
Nov. 19, 2012 (DE) ......................... 10 2012 221 106

(51) Int. Cl.
*B05D 1/02* (2006.01)
*B05D 1/18* (2006.01)
(Continued)

(52) U.S. Cl.
CPC ............ *C23C 18/1291* (2013.01); *C09D 1/00* (2013.01); *C09D 5/08* (2013.01); *C09D 5/106* (2013.01);
(Continued)

(58) Field of Classification Search
CPC ............ C23C 18/1291; C23C 18/1216; C23C 18/1225; C23C 22/68; C23C 22/73;
(Continued)

(56) References Cited

U.S. PATENT DOCUMENTS 5,180,686 A   1/1993   Banerjee et al.
5,660,707 A   8/1997   Shastry et al.
(Continued)

FOREIGN PATENT DOCUMENTS

DE   10 103 463 A1   8/2002
EP   0 744 475 A1    11/1996
WO   2006/108425 A1  10/2006

*Primary Examiner* — Kirsten Jolley
(74) *Attorney, Agent, or Firm* — Armstrong Teasdale LLC

(57) ABSTRACT

A method for coating metallic surfaces with an aqueous composition, which contains an aqueous solution of a zinc salt, by flooding, spraying and/or immersion, wherein, for spraying or immersion, the initial temperature of the substrate lies in the range from 5 to 400° C., in that, for flooding, the initial temperature of the substrate lies in the range from 100 to 400° C. and in that an anticorrosive nanocrystalline zinc oxide layer is formed on the metallic surface. Corresponding aqueous composition, the nanocrystalline zinc oxide layer and the use of the coated substrates are also disclosed.

16 Claims, 5 Drawing Sheets

(51) Int. Cl.
    *C23C 18/12*     (2006.01)
    *C09D 1/00*     (2006.01)
    *C09D 5/08*     (2006.01)
    *C23C 22/68*     (2006.01)
    *C23C 22/73*     (2006.01)
    *C09D 5/10*     (2006.01)
    *B05D 3/00*     (2006.01)

(52) U.S. Cl.
    CPC ...... *C23C 18/1216* (2013.01); *C23C 18/1225* (2013.01); *C23C 18/1241* (2013.01); *C23C 22/68* (2013.01); *C23C 22/73* (2013.01); *B05D 1/02* (2013.01); *B05D 1/18* (2013.01); *B05D 3/002* (2013.01); *Y10T 428/31663* (2015.04)

(58) Field of Classification Search
    CPC ........ C23C 18/1241; C09D 1/00; C09D 5/08; B05D 1/02; B05D 1/18; B05D 3/002
    USPC ...................................... 427/318, 430.1, 427
    See application file for complete search history.

(56) References Cited

U.S. PATENT DOCUMENTS

| | | |
|---|---|---|
| 5,714,049 A | 2/1998 | Shastry et al. |
| 8,808,801 B2 | 8/2014 | Krunks et al. |
| 2008/0280058 A1 | 11/2008 | Krunks et al. |
| 2008/0295886 A1 | 12/2008 | Hu et al. |
| 2009/0098043 A1 | 4/2009 | Song et al. |
| 2012/0061836 A1* | 3/2012 | Guo ................ C23C 18/1216 257/741 |
| 2012/0225250 A1* | 9/2012 | Kuznetsov .......... C23C 18/08 428/156 |

* cited by examiner

METHOD FOR COATING METALLIC SURFACES WITH NANOCRYSTALLINE ZINC OXIDE LAYERS, AQUEOUS COMPOSITIONS THEREFOR AND USE OF THE SURFACES COATED IN THIS WAY

This application is a § 371 of International Application No. PCT/EP2013/073668 filed Nov. 13, 2013, and claims priority from German Patent Application No. 10 2012 221 106.3 filed Nov. 19, 2012.

The invention relates to a method for coating metallic surfaces with an aqueous composition for forming a corrosion-resistant nanocrystalline zinc oxide layer, corresponding aqueous compositions and use of the surfaces according to the method according to the invention.

In the search for alternative corrosion-resistant coatings, what are of particular interest in the protection of zinc-containing metallic surfaces are coatings that contain a zinc compound such as zinc oxide. It is basic knowledge that zinc oxide can form a passivation layer on hot-galvanized surfaces, for example. Known from DE 101 03 463 A1 are zinc oxide coatings produced by way of plasma polymerization. Such a coating method is extraordinarily complicated and only applicable in exceptional cases in coating technology. EP 0 744 475 A1 teaches a method in which a basic solution is used to produce a zinc oxide coating on a zinc-coated steel plate to improve the weldability and workability thereof.

It is common today to provide protection against corrosion a) by treating or passivating passivation coatings without providing any subsequent coating such as a paint coating or b) by pre-treating or conversion coating prior to a subsequent coating with a primer, paint and/or adhesive layer, for example. In the latter case, the conversion coating must also have a high paint adhesion for the subsequent coating.

Zinc oxide coatings can exhibit high corrosion protection and a high paint adhesion, in particular as crystalline particles grown on the metallic surface.

Such coatings can be produced by growing nanocrystalline zinc oxide coatings on zinc or zinc alloy surfaces in particular, for example. Most methods for coating surfaces with crystalline particles have very high temperatures and often very long treatment times. They are therefore not usually suitable for corrosion-resistance treatment or pre-treatment of metallic surfaces at industrial scales.

This gave rise to the objective of proposing coating methods and aqueous compositions that are suitable for corrosion-resistance treatment or pre-treatment of metallic surfaces. It would also be advantageous if this method and these compositions could enable coatings with high corrosion resistance and/or high paint adhesion. Another advantage would be if they could be easily produced. Finally, it would be an advantage if they could be used in series and/or in a strip processing system.

It has now been found that it is possible to produce nanocrystalline zinc oxide coatings with high quality for protecting metallic surfaces. It has also been found that it is possible to produce nanocrystalline zinc oxide coatings under industrially suitable conditions.

It has also been found that by quenching hot metallic substrates, for example from a temperature of 200, 250 or 300° C. to room temperature while contacting the same with a low-temperature aqueous composition, through immersion in particular, at a temperature of about 25° C., for example, nanocrystalline zinc oxide coatings result to some extent, and these coatings have a dense layer structure and sometimes higher blank corrosion resistance than obtained without quenching. Also, very short contact times are enough to form an even wide-coverage zinc oxide coating. Therefore, such quenching processes are very suitable for industrial applications in particular.

The object is achieved by way of a method for coating metallic surfaces with an aqueous composition, which is or contains an aqueous solution of a zinc salt, by flooding, spraying and/or immersion, the initial temperature of the substrate lying in the range from 5 to 400° C. for spraying or immersion, the initial temperature of the substrate lying in the range from 100 to 400° C. for flooding, and a corrosion-protection nanocrystalline zinc oxide layer being formed on the metallic surface.

It is preferable for the aqueous composition to substantially or entirely consist of an aqueous solution of a zinc salt.

This causes a coating to be produced on the metallic surface which is preferably either substantially or entirely closed, in particular in the area of the border to the metallic surface. The coating according to the invention, in particular at the border to the metallic surface, can preferably either solely consist of zinc oxide or can consist essentially of zinc oxide. In particular, the coating according to the invention consists of zinc oxide on more than 75%, more than 80%, more than 85%, more than 90%, more than 95%, more than 98%, more than 99% or 100% of the surface—relative to the theoretical amount derived from the aqueous composition and/or relative to energy-dispersive X-ray analysis EDX for information measured at a certain depth and, if possible, without surface effects. EDX provides imprecise information here, for example concerning the amounts of alkali metals, alkaline earth metals and light elements such as nitrogen, phosphorus and sulfur. It is preferable that a corrosion-protecting nanocrystalline zinc oxide coating be formed in which the zinc oxide crystals, alternatively together with other phases, are smoothly connected, or substantially smoothly connected together—in particular near the border to the metallic surface—and/or in which the zinc oxide crystals, alternatively together with other phases, completely cover the metallic surface.

It is especially preferred for a zinc oxide coating to be formed and/or crystallized in contact with the aqueous composition. Zinc oxide crystals or mixed zinc oxide crystals are preferred to be formed which have an average particle and/or crystal diameter in the range from 1 to 200 nm, in particular when observing the top side of the coating under a scanning electron microscope SEM, and alternatively in the case of elongated particles an average particle length in the range from 10 to 2000 nm in the aqueous composition and/or in the coating formed therefrom. In many embodiments, coatings arise in which many of the particles and/or crystals protrude out from the continuous coating. Some of the particles have such an intrinsic structure that the particles on the top of the coating can be considered to be idiomorphically formed crystals. In many embodiments, the individual zinc oxide particles and/or crystals grow so densely together that the individual particles and/or crystals are difficult if not impossible to differentiate from one another visually under the scanning electron microscope since they no longer have a clear intrinsic structure and/or barely protrude from the coating if at all any longer. In embodiments with a high fraction of dopants, binders and/or other substances, coatings often arise in which other phases can be seen in addition to zinc oxide.

Figure 1:
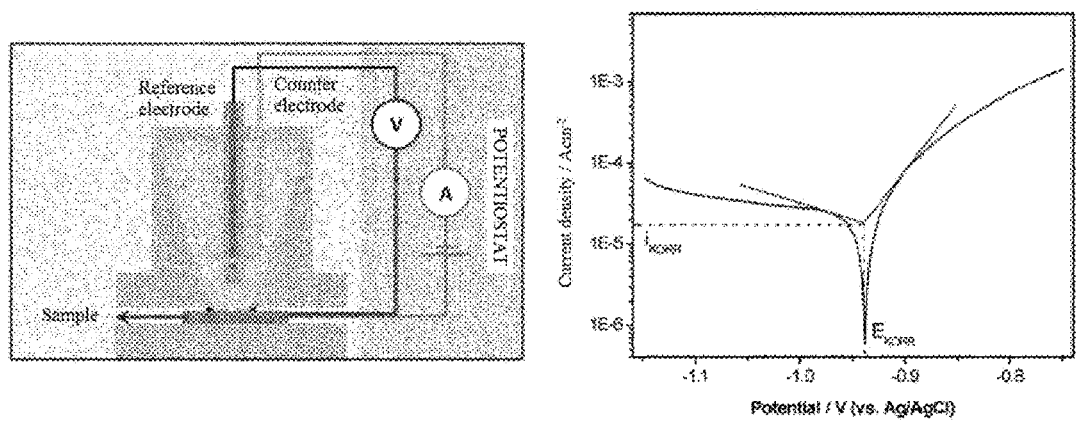
FIG. 1 is a schematic (left) of an exemplary test setup to obtain current density measurements and a graph (right) of a principle for calculating corrosion current $i_{KORR}$.

In the method according to the invention, in particular a metallic aluminum, aluminum alloy, steel, zinc and/or zinc alloy surface can be contacted with an aqueous composition.

What is especially advantageous is when the metallic surface of the substrate has a temperature of greater than 120° C. and if the substrate is quenched in contact with the aqueous composition. In particular, the metallic surface of the substrate then has a temperature of greater than 140° C., greater than 160° C., greater than 180° C., greater than 200° C., greater than 220° C., greater than 240° C., greater than 260° C., greater than 280° C., greater than 300° C., greater than 320° C., greater than 340° C., greater than 360° C., greater than 380° C. or greater than 400° C. The temperature of the aqueous composition can preferably be in the range from 10 to 90° C. so that the temperature difference applied during quenching is at least 30° C., at least 50° C., at least 70° C., at least 90° C., at least 110° C., at least 130° C., at least 150° C., at least 170° C., at least 190° C., at least 210° C., at least 230° C., at least 250° C., at least 270° C., at least 290° C., at least 310° C., at least 330° C., at least 350° C., at least 370° C. or at least 390° C. In industrial processes, such as in the coating of metallic strips such as an aluminum alloy strip, steel strip or galvanized steel strip or in the manufacture of individual metallic components such as is done following hot-galvanizing, the process heat from the strip or individual part can be utilized to perform a different type of cooling so as to produce a different type of nanocrystalline zinc oxide coating, such as a more dense nanocrystalline zinc oxide coating, for example, to produce a nanocrystalline coating more quickly and/or to significantly increase the corrosion resistance of the strip so coated. In particular, the coating produced by quenching can be oxidized, preferably at least one anion, such as acetate $C_2H_3O_2$ being oxidized, for example to acetone, formaldehyde, carbon dioxide and/or similar phases. In particular for immersion, the zinc oxide crystals can grow longer and longer, and sometimes even broader, with contact time, it also being possible for the zinc oxide crystals to grow together and become interlocked better over a longer contact time.

It has been shown that there are primarily three variations in the manufacture of the coating that achieve this object: Coating methods by A) spraying, B) flooding and/or C) immersion, which are described in detail after the section on aqueous compositions and coatings thereof.

General Aqueous Compositions According to the Invention and Coatings Thereof:

The possible aqueous compositions according to the invention and the substances contained therein that can be used in spraying, flooding and/or immersion, are indicated below. When specific amounts of an aqueous composition are preferably used in any of these types of applications, this is described beforehand for the respective application type.

The aqueous compositions of the method according to the invention are preferred to have a pH in the range from 2 to 13, from 4 to 13, from 5 to 12.5 or from 6 to 12 and a zinc content in the range from 0.001 to 100 g/L, it also being possible for the zinc content to be initially zero when zinc-containing metallic surfaces are contacted. This is because a pickling effect can cause zinc to be removed from the metallic surface and absorbed into the composition.

1.) Water, in particular DI water, or alternatively water in an aqueous mixture with a fraction thereof being at least one organic solvent such as at least one short-chained alcohol with 1 to 5 C atoms, in particular ethanol, the fraction of all organic solvents to all solvents preferably being zero or in the range from 0.01 to 50 wt.-%, from 0.1 to 20 wt.-%, from 0.5 to 12 wt.-%, from 1 to 8 wt.-% or from 2 to 5 wt.-% of all components of the aqueous composition.

2.a) Usually, in the coating of metallic surfaces the operation is done using an amount of at least one water-soluble and/or alcoholic zinc-containing compound 2.a) in the aqueous composition. At least one zinc salt is particularly preferred here, it being possible to select the zinc salts from chlorides, nitrates, sulfates, phosphorus-containing salts, alcoholates, alkoxides and/or salts of organic acids such as zinc acetate dihydrate, zinc acetylacetonate hydrate, zinc citrate dihydrate, zinc nitrate hexahydrate and/or zinc chloride.

It is preferable for the amount of zinc-containing compounds in the aqueous composition to be in the range from 0.001 to 100 g/L relative to the amount of elemental zinc, particularly preferred to be in the range from 0.1 to 80 g/L, from 0.5 to 60 g/L, from 1 to 50 g/L, from 1.5 to 40 g/L, from 2 to 30 g/L, from 3 to 20 g/L, from 5 to 15 g/L or from 8 to 12 g/L of the zinc-containing compounds added.

In particular for the 2.a) embodiments, the pH of the aqueous solution is preferred to be adjusted such that it lies within the range from 4 to 13, from 4.5 to 12, from 5 to 10, from 5.5 to 8 or from 6 to 7. If the pH is less than 5, accelerated dissolution of the metal or the alloy of the metallic surface can occur on the substrate. If the pH is greater than 8, and/or if the zinc content of the composition is elevated, precipitation can occur in baths without additives, such as for stabilization, for example due to the lack of complex formation when no complexing agent is present.

2.b) On the other hand, the addition of a zinc-containing compound to such aqueous compositions is not absolutely necessary if the composition pickles zinc-containing metallic surfaces under the conditions of use selected. In this case, then, zinc is brought into the solution, alternatively together with small amounts of alloying elements and/or contaminants. The term pickling with respect to this application encompasses alkaline etching as well as an alternative. Then, instead of the zinc-containing compound, at least one base or at least one acid is added to dissolve zinc from a zinc-containing metallic surface and/or is contained in [the solution].

The amount of zinc-free compounds 2.b) that provide $H^+$ ions, $OH^-$ ions, other cations and/or other anions and that can contribute to the dissolution of zinc from a zinc-containing metallic surface is in this case preferred to lie within the range from 0.001 to 400 g/L, especially preferably in the range from 0.1 to 120 g/L, 0.5 to 80 g/L, 1 to 50 g/L, 1.5 to 40 g/L, 2 to 30 g/L, 3 to 20 g/L, 5 to 15 g/L or 8 to 12 g/L based on the compounds added and/or contained therein. The amounts of zinc-free compounds 2.b) can be present as an alternative to or in addition to the amounts of at least one zinc-containing compound 2.a), and where the amounts of the at least one zinc-containing compound 2.a)

are low it is especially preferred to be together with at least one zinc-free compound 2.b).

For embodiments 2.b) in particular, the pH of the aqueous solution is preferred to be adjusted such that it lies in the range from 4 to 6, 4.5 to 5.5, 8 to 13 or 9 to 11 in order to bring zinc and alternatively other cations out of the metallic surfaces and into solution due to the pickling effect.

In the method according to the invention, a preferably metallic surface of zinc and/or a zinc alloy is placed in contact with an aqueous composition that has no amount of zinc or has an amount of zinc in the range from 0.001 to 100 g/L calculated as a metal, an amount of zinc being added to the aqueous composition, raising the zinc content thereof due to a pickling effect of the aqueous composition.

If necessary, other components can be added to the aqueous compositions and/or contained therein:

3.) In the method according to the invention, a nanocrystalline zinc oxide coating can be formed, preferably with a respective amount of at least one hydroxide, oxide—including a multiple oxide such as spinel, for example—and/or phosphate, in particular a respective amount of an element selected from the group consisting of aluminum barium, boron, calcium, iron, hafnium, cobalt, copper, lanthanum, lanthanide, magnesium, manganese, nickel, phosphorus, silicon, nitrogen, strontium, titanium, yttrium, zinc and zirconium. The substances formed in this manner can be a sequence of doping the aqueous composition or the nanocrystalline zinc oxide coating and/or a sequence of addition, in particular for modifying characteristics and/or optimization. To do so, dopants and related additives can be used, such as water and/or alcohol-soluble compounds, preferably of aluminum, barium, boron, calcium, iron, hafnium, cobalt, copper, lanthanum, lanthanide, magnesium, manganese, nickel, phosphorus, silicon, nitrogen, strontium, titanium, yttrium, zinc and/or zirconium.

They are especially preferred to be added within the range from 0.0001 to 15 g/L, 0.001 to 6 g/L, 0.1 to 5 g/L, 0.2 to 4 g/L, 0.3 to 3 [or] g/L, 0.4 to 2 g/L, 0.5 to 1.5 g/L or 0.8 to 1.2 g/L based on the amount of metal/metalloid-containing compound calculated as an element of the metal/metalloid-containing compound and/or are contained in these amounts in the aqueous composition, in particular as chlorides, nitrates, sulfates, phosphorus-containing salts such as orthophosphates and/or as salts of organic compounds such as carboxylic acid salts, alcoholates and/or alkoxides.

Especially preferred compounds include those of aluminum, barium, boron, calcium, copper, at least one lanthanide such as cerium, magnesium, manganese, nickel, titanium and/or zirconium. What is especially preferred are compounds in which these cations occur together with the anions mentioned prior. The ratio of zinc calculated as a metal to the dopant calculated as a metal is preferred to be in the range from 1:0.00001 to 1:2, especially preferably in the range from 1:0.0001 to 1:1.6, 1:0.0001 to 1:1.2, 1:0.0001 to 1:0.8, 1:0.001 to 1:0.4, or 1:0.03 to 1:0.1.

Figure 7:
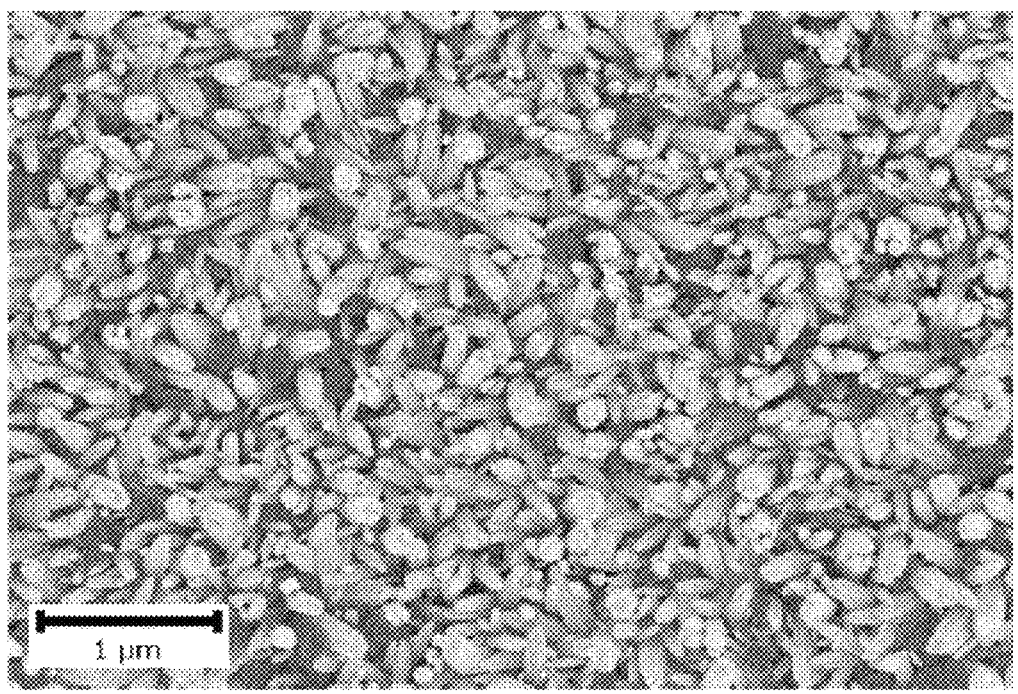
FIG. 7 is a scanning electron microscope image of Ce-doped zinc oxide coating manufactured in an immersion process.

Alternatively, and in particular when at a low level, the dopant can result in the zinc oxide crystals having foreign atoms and/or defects and/or are mixed crystals. When the dopant content is limited or elevated, it can also appear as a separate phase in addition to zinc oxide, for example in spandrels between columnar zinc oxide crystals, as shown in FIG. 7, for example. For the sake of simplicity, in this application "zinc oxide [ . . . ]" is referred to instead of "zinc oxide [ . . . ] and/or zinc mixed oxide [ . . . ]" even when "zinc mixed oxide [ . . . ]" is also covered. The dopant can help improve the properties of the zinc oxide or zinc mixed oxide, such as crystallinity, crystal properties, electrical properties, electrochemical properties such as the dissolution rate during corrosion and/or properties of the coating.

4.) Means for pH adjustment and/or for stabilizing the aqueous composition: Alkaline means that can be added to the aqueous composition and/or be included therein include primary, secondary and/or tertiary amines, in particular, and/or amino compounds such as hexamethylene tetramine, aminocarboxylic acids and derivatives thereof, such as ethylenediaminetetraacetic acid EDTA, alkali metal hydroxides and/or salts, ammonia, ammonium compounds and/or other salts of organic acids. What are especially preferred here are compounds with a low amount of carbon, or none at all. Alternatively, or in addition thereto, at least one acid such as a weak organic acid, such as citric acid, acetic acid, gluconic acid and/or at least one acid salt can be added to or be included in the aqueous composition.

Preferably, at least one means for adjusting the pH and/or for stabilization is used in an overall amount in the range from 0.001 to 60 g/L based on the respective compound added and/or contained, especially preferably in the range from 0.01 to 45 g/L, 0.1 to 30 g/L, 0.2 to 15 g/L, 0.5 to 8 g/L or 1 to 3 g/L of the added and/or contained compounds.

The means for pH adjustment and/or stabilization can on the one hand help to provide a controlled deposition, and on the other hand can help, in many embodiments, to reach a higher degree of crystallinity of the coating according to the invention, which can be determined using X-ray diffraction.

5.) Binders: A binder is added only in a few variants. Possible binders here can include, respectively, at least one polymer/co-polymer, for example based on acrylate, epoxide, ionomer, polycarbonate, polyester, polyether and/or polyurethane, optionally with an amount of cross-linking agent, silane/silanol/siloxane/polysiloxane—with silane, silanol and/or siloxane, oxane and/or silicate such as an alkyl silicate and/or a water glass being used in the aqueous composition. The addition of a binder can help provide the coatings produced therewith to have a higher corrosion resistance and optionally increased barrier properties.

The total amount of all binders can be used at an overall amount in the range from 0.001 to 10 g/L based on the respective compounds added and/or contained, especially preferably in the range from 0.01 to 8 g/L, 0.05 to 6 g/L, 0.1 to 4 g/L, 0.2 to 2.5 g/L or 0.25 to 1.5 g/L of the added and/or contained compounds.

6.) Additives: In many aqueous compositions, at least one additive is used. Possible additives include, in particular, at least one wetting agent, biocide, antifoaming agent, complexing agent and/or flow agent, respectively—unless already present in one of the previously named substance groups, in particular at least one surfactant, low-carbon and/or carbon-free compounds being especially preferred in particular.

The total amount of all additives can be used at an overall amount in the range from 0.001 to 10 g/L based on the respective compounds added and/or contained, especially preferably in the range from 0.01 to 8 g/L, 0.05 to 6 g/L, 0.1 to 4 g/L, 0.2 to 20 g/L or 0.25 to 1.5 g/L of the added and/or contained compounds.

In the method according to the invention, the aqueous composition can preferably contain at least on pH adjusting means and/or stabilization means for the aqueous composition 4.), at least one binder 5.) and/or at least one additive 6.).

It is preferred for the aqueous composition according to the invention to contain the following, the amount of zinc-containing compounds being indicated as an amount of elemental zinc and the remaining compounds being indicated by the amount of substances, an amount of compounds 2.a) or compounds 2.b) being required:
a) 0 or 0.001 to 100 g/L of zinc-containing compounds 2.a) and
b) 0 or 0.001 to 300 g/L of zinc-free compounds 2.b) and
0 or 0.0001 to 50 g/L of dopant,
0 or 0.0001 to 60 g/L of means for pH adjustment and/or for stabilization of the aqueous composition,
0 or 0.001 to 10 g/L of binder and/or
0 or 0.001 to 10 g/L of additives, the use of zinc-free compounds 2.b) also causing zinc from the zinc-containing metallic surface to be pickled out and absorbed by the aqueous composition.

It is preferable for the weight ratio of zinc-containing compounds, including zinc ions, to the total amount of solids to be in the range from 80 to 100 wt.-%, 85 to 99 wt.-%, 90 to 98 wt.-% or 95 to 97 wt.-%. It is preferable for the weight ratio of zinc in the zinc-containing compounds, including zinc ions, to the total weight of solids to be in the range from 40 to 80 wt.-% or 50 to 60 wt.-%.

In particularly preferred variants, the aqueous composition according to the invention contains the following, the amount of zinc-containing compounds being indicated as an amount of elemental zinc, the remaining compounds being indicated with the amount of the substances, and an amount of compounds 2.a) or compounds 2.b) being required:
a) 0 or 0.001 to 80 g/L of zinc-containing compounds 2.a) or
a) 20 to 100 g/L of zinc-containing compounds 2.a) and
b) 0 or 0.01 to 240 g/L of zinc-free compounds 2.b) and
c) at least one of the following components:
  0.001 to 30 g/L dopant,
  0.001 to 40 g/L of pH adjustment means and/or means for stabilizing the aqueous composition,
  0.001 to 6 g/L of binder and/or
  0.001 to 6 g/L of additives.

In another especially preferred embodiment, the composition according to the invention contains the following:

|      | 0.3 to 20 g/L of zinc-containing compounds 2.a) or 35 to 100 g/L of zinc-containing compounds 2.a) and |
|------|------|
| 0 or | 0.3 to 60 g/L of zinc-free compounds 2.b) and |
| 0 or | 0.4 to 10 g/L of dopant, |
| 0 or | 0.01 to 20 g/L of pH adjustment means and/or means for stabilizing the aqueous composition, |
| 0 or | 0.3 to 2.5 g/L of binder and/or |
| 0 or | 0.2 to 2.5 g/L of additives. |

In another especially preferred embodiment, the composition according to the invention contains the following:

|      | 1 to 3 g/L of zinc-containing compounds 2.a) and |
|------|------|
| 0 or | 1 to 10 g/L of zinc-free compounds 2.b) and |
| 0 or | 0.8 to 5 g/L of dopant based on metal content, |
| 0 or | 2 to 6 g/L means for pH adjustment and/or for stabilization of the aqueous composition, |
| 0 or | 0.5 to 1.5 g/L binder and/or 0 or 0.25 to 1.5 g/L additives. |

The object is also achieved with an aqueous composition corresponding to the independent substance claim.

The object is also achieved with a nanocrystalline zinc oxide coating that is produced according to at least one of the method claims and/or using an aqueous composition according to the independent substance claim.

The aqueous compositions according to the invention frequently have a concentration of solids and active substances (total concentration) in the range from 10 to 800 g/L. Active substances are those substances that are not solid or often exist in dissolved form, but can take part in chemical reactions. A concentrate can often have a total concentration in the range from 200 to 750 g/L, in particular 400 to 700 g/L. Bath compositions can be produced from these by dilution, in particular with water. It is preferred to use only water and no organic solvent for the dilution of a concentrate. The dilution of a concentrate is preferred to be done by a factor in the range from 1.1 to 25, especially preferably in the range from 1.5 to 16, 2 to 10 or 3 to 6. Particularly for flooding, the amount of solids and active substances to be adjusted in the aqueous composition depends primarily on the type of substrate to be coated, the system and on the wet film thickness, which is often a function of the system.

In many embodiments, the composition according to the invention is used for metallic strip or coil, in particular in a strip coating process. Many of the strip processing systems used today have a strip speed in the range from 10 to 200 m/min. The faster the strip travels, the faster the reactions have to be between the composition according to the invention and the metallic surface in order to not need system sections that are too long. The reaction time between the application of the composition and the complete drying thereof can be from a fraction of a second up to about 60 seconds. For the faster strip processing systems, this can in particular cause the aqueous composition to be not reactive enough and therefore need to be more acidic or more alkaline, thereby having a greater pickling effect. It is preferable for the pH to lie in the range from 2 to 13 during the coating of strips or coils. The concentration of all solids and active substances of the aqueous composition for coating in strip processing systems often lies in the range from 200 to 800 or 300 to 650 g/L.

In many embodiment variations, a wet film of the aqueous composition is applied to metallic strips or sheets and dried thereon (in a drying or no-rinse process). The drying forms a layer by way of reactions of the composition according to the invention, for example by thermal oxidation processes. Drying is often done after flooding or spraying, and preferably uses waste heat, for example from the hot galvanization process. For flooding or spraying, the composition according to the invention can be adapted specifically for slow or fast treatment in a strip processing system, for example by suitably adjusting the concentration, using a suitable spraying rate and suitable pH. Then, neither the wet film nor the dried film is rinsed with water so that the cations and compounds pickled out of the metallic surface are not removed, but rather are incorporated into the coating upon drying.

Alternatively, an additional rinsing with water after flooding or spraying can be done before or after drying and alternatively before and after drying and alternatively after further cooling (rinse process) in order to wash off excess salts.

In the method according to the invention, the aqueous composition according to the invention can be used to form a corrosion-resistant coating on the metallic surface, the coating having a high amount of zinc oxide crystals and/or being made of zinc oxide crystals or being formed substantially of zinc oxide crystal.

The nanocrystalline zinc oxide coating produced according to the invention can have a coating composition that varies within broad limits—independent of the type of application selected, such as A), B) and/or C). In particular, it can be characterized in that it contains:

|  |  |
| --- | --- |
|  | 75 to 100 wt.-% zinc oxide and |
| 0 or | 0.001 to 30 wt.-% doping elements and |
| 0 or | 0.001 to 15 wt.-% carbon and |
| 0 or | 0.001 to 25 wt.-% silicon. |

In a particularly preferred variant, the nanocrystalline zinc oxide coating according to the invention contains the following:

|  |  |
| --- | --- |
|  | 80 to 100 wt.-% zinc oxide and |
|  | 0 or .001 to 20 wt.-% doping elements and |
| 0 or | 0.001 to 10 wt.-% carbon and |
| 0 or | 0.001 to 20 wt.-% silicon. |

In another especially preferred embodiment, the nanocrystalline zinc oxide coating according to the invention contains the following:

|  |  |
| --- | --- |
|  | 85 to 100 wt.-% zinc oxide and |
| 0 or | 0.001 to 15 wt.-% doping elements and |
| 0 or | 0.001 to 5 wt.-% carbon and |
| 0 or | 0.001 to 10 wt.-% silicon. |

In another especially preferred embodiment, the nanocrystalline zinc oxide coating according to the invention contains the following:

|  |  |
| --- | --- |
|  | 90 to 100 wt.-% zinc oxide and |
| 0 or | 0.001 to 10 wt.-% doping elements and |
| 0 or | 0.001 to 3 wt.-% carbon and |
| 0 or | 0.001 to 5 wt.-% silicon. |

In another especially preferred embodiment, the nanocrystalline zinc oxide coating according to the invention contains the following:

|  |  |
| --- | --- |
|  | 95 to 100 wt.-% zinc oxide and |
| 0 or | 0.001 to 5 wt.-% doping elements and |
| 0 or | 0.001 to 3 wt.-% carbon and |
| 0 or | 0.001 to 5 wt.-% silicon. |

In another especially preferred embodiment, the nanocrystalline zinc oxide coating according to the invention contains the following:

|  |  |
| --- | --- |
|  | 98 to 100 wt.-% zinc oxide and |
| 0 or | 0.001 to 2 wt.-% doping elements and |
| 0 or | 0.001 to 2 wt-% carbon and |
| 0 or | 0.001 to 2 wt.-% silicon. |

In all compositions of the zinc oxide coating according to the invention listed here, the zinc oxide contained therein, respectively, must be such that the oxide, alternatively as a mixed zinc oxide, can also contain doping elements, carbon and/or silicon. Alternatively, small amounts of carbon can also act as a doping element.

In the method according to the invention, it is preferred for a weak or strong crystalline zinc oxide coating to be formed, especially preferably a strong crystalline zinc oxide coating. This coating can have an amount of zinc oxide in the range from 75 wt.-% to 100 wt.-%, 80 to 99 wt.-%, 90 to 98 wt.-%, 94 to 96 wt.-% or 97 to 100 wt.-%. It is preferable for the total amount of zinc oxide in the nanocrystalline zinc oxide coating to be crystalline. It is especially preferred for the total amount of zinc oxide in the nanocrystalline zinc oxide coating to be formed from crystalline zinc oxide, the crystal forms of which can be seen in SEM photographs. In X-ray diffraction investigations, it was proven that the zinc oxide is usually not X-ray amorphous, but exists in crystalline form. On the other hand, all zinc oxide coatings examined showed a clear crystalline formation of the zinc oxide or mixed zinc oxide produced. It is especially preferred that zinc oxide or mixed zinc oxide be produced that has a high degree of crystallinity and/or few defects in the matrix of the zinc oxide or mixed zinc oxide. Mixed zinc oxide is produced in particular when a high amount of dopant is added. However, for purposes of simplification "zinc oxide" is referred to in this application even if the oxide is partially mixed oxides whenever no specifics are given concerning the composition of the aqueous composition or the coating composition. Alternatively, there can even be fractions of other inorganic phases contained therein, such as carbides, carbon, spinels, metal phosphates, molybdenates, vanadates and/or tungstates.

In an especially preferred variant of the method, a nanocrystalline zinc oxide coating can be formed that has an amount of at least one corrosion inhibitor, at least one silane/silanol/siloxane/polysiloxane, at least one polysiloxane, at least one organic polymer/co-polymer, at least one silicate and/or at least one additive. Possible corrosion inhibitors can derive from doping additives and that are of an inorganic or organometallic nature, for example, and/or added corrosion inhibitors and/or nitrogen compounds such as azols and/or amines.

The coating produced according to the invention can have a coating thickness in the range from 0.002 to 20 µm, a nanocrystalline zinc oxide coating often having a coating thickness in the range from 0.002 to 5 µm, 0.005 to 2 µm, 0.01 to 1 µm, 0.01 to 0.5 µm or 0.01 to 0.25 µm. If inorganic components are not incorporated into the zinc oxide, the corresponding substances can be incorporated into the coating as spandrel fill and/or boundary surface phases, for example. In coatings produced by immersion, under certain conditions a binder can also be at least partially applied to the nanocrystalline zinc oxide coating. An amount of carbon from carbon-rich compounds in particular can be incorporated in small amounts into the coating and/or minimally accumulated onto the rough surface of the coating. On the other hand, no amount of nitrogen, for example coming from the amine, was detected in the coating in initial investigations.

In the method according to the invention, the nanocrystalline zinc oxide coating can be dried, if necessary, after it is applied. In the method according to the invention, the nanocrystalline zinc oxide coating can be preferably coated with another coating composition after it is applied with or without subsequent rinsing with water.

The nanocrystalline zinc oxide coating can be preferably dried after application, and alternatively another coating can be applied thereafter. Alternatively, the nanocrystalline zinc oxide coating can be preferably not dried, or incompletely dried, after application, and thereafter another coating can be applied to the not yet dried nanocrystalline zinc oxide coating.

In the method according to the invention, at least one other coating can be alternatively applied to the nanocrystalline zinc oxide coating without drying or after drying, in particular based, respectively, on at least one corrosion inhibitor, a phosphate, a phosphonate, a siloxane and/or polysiloxane produced from silane, silanol and/or siloxane in the aqueous composition, a polysiloxane, a compound based on titanium, hafnium, zirconium, yttrium and/or at least one lanthanide such as cerium, an organic polymer/copolymer, an adhesion promoter, for example based on a carboxylic acid such as polyacrylic acid, a corrosion inhibitor and/or a silicate, the other coating being a second pre-treatment coating, for example, and/or as at least one coating with at least one binder such as a primer, paint and/or adhesive. It is especially preferred in this regard to apply a coating to a nanocrystalline zinc oxide coating that is based on at least one phosphonate or based on at least one siloxane/polysiloxane produced from silane/silanol/siloxane in the aqueous composition, alternatively together with other components, it being possible to use the coating used as a second pre-treatment coating, for example. In particular, the primer, paint and/or adhesive can be a composition based on polyacrylic acid, acrylate, epoxide, ionomer, phenol, polycarbonate, polyester, polyether, polyurethane and/or vinyl, alternatively with an amount of cross-linking agent such as that based on amine, aziridine, azo compound, formaldehyde, imide, imidazole, isocyanate, isocyanurate, melamine, peroxide, triazine, triazole, titanium and/or zirconium compound, silane/silanol/siloxane/polysiloxane and/or additive(s) such as initiators, for example. What has proven fruitful has been, among other things, to apply a coating that is primarily, substantially or solely based on polyacrylic acid, nitrogen-containing silanes such as aminosilanes, phosphonates or biphosphonates.

Coating Method by Way of Spraying, Flooding and/or Immersion:

It has been found that there are primarily three variations in the manufacture of the coating that achieve this object: Coating methods by A) spraying, B) flooding and/or C) immersion, which are described separately below. These coating variations can also be combined with one another in infrequent embodiments. They also transition smoothly among one another.

A) Spraying:

Coating with an aqueous composition by spraying, it being possible for intensive contact between the metallic surface and the aqueous composition to occur, in particular at elevated substrate temperatures. Substantially fresh or only fresh composition comes into contact with the metallic surface. This and the fact that droplets from the treatment solution are applied to the surface at a relatively high pressure ensures rapid exchange of the chemical components of the treatment solution at the substrate surface. Thus, the thickness of the diffusion layer and thus the chemical gradient between the surface and the interior of the treatment solution is much less than in immersion. Therefore, there is high reactivity associated with spraying. As a result, relatively short treatment times can be achieved. It is preferable to operate at a substrate temperature range from about 5 to 400° C. and/or preferably at a temperature of the composition in the range from 5 to 98° C., it being preferred for at least one of the two temperatures to be at least 50° C. It is preferable for the substrate temperature to be at least 30° C. greater than the temperature of the aqueous composition. Surprisingly, the spray method was modified in such a way as to make it suitable for coating rapidly moving strips or coils, in particular at high quenching temperature differences.

In an especially preferred embodiment, the method is operated at an initial substrate temperature range from about 5 to 400° C. and an initial temperature of the aqueous composition in the range from 5 to 98° C., at least one of the two temperatures being at least 50° C. It is especially preferred for the initial temperature of the aqueous composition to lie in the range from 12 to 95° C., 14 to 90° C., 16 to 80° C., 18 to 60° C. or 20 to 40° C. It is especially preferable to operate at an initial substrate temperature in the range from 10 to 400° C., 20 to 320° C., 40 to 280° C., 60 to 240° C., 80 to 200° C. or 100 to 160° C. or in the range from 250 to 340° C. It is especially preferred to add at least one zinc-containing compound such as zinc acetate dihydrate to the aqueous composition for spraying purposes. The spray pressure can be maintained within limits common to industry for spraying. It is preferred to be in a range from 0.3 to 5, 0.8 to 3 bar or 1 to 2.5 bar. It can be sprayed using corresponding nozzles in one stream or a plurality of streams, from a ring in at least one curtain or similarly.

The sprayed amount of aqueous composition depends on the concentration of the chemical elements such as zinc, the spraying rate and the spraying pressure. It is preferable for it to be adjusted such that the spray rate is in the range from 0.1 to 100 ml, 1 ml to 50 ml, 2 to 25 ml or 3 to 15 ml for a surface area of 200 $cm^2$ per minutes.

If at least one means for adjusting the pH and/or for stabilization 4.) is used for spraying, the total amount of this means is preferred to be in the range from 0.0001 to 60 g/L based on the respective compound added, especially preferably in the range from 0.001 to 40 g/L, 0.01 to 20 g/L, 0.1 to 15 g/L, 0.5 to 10 g/L, 1 to 8 g/L or 2 to 6 g/L of the added compounds.

During spraying, comparatively short coating times can often be selected such that even fast moving bander or coils can be coated. It is common for even nanocrystalline zinc oxide coatings to result on freshly galvanized or freshly cleaned metallic surfaces. Therefore it is not absolutely necessary to perform an alkaline cleaning beforehand, for example. The composition of the nanocrystalline zinc oxide coating can be adjusted and controlled especially well using a spraying method. In this method, the chemical usage is comparatively low since there is hardly any precipitation and foaming due to the short contact times. Suitable temperatures and/or initial temperatures of the aqueous composition during coating are in particular 10 to 40° C. or even 5 to 98° C. However, a lower temperature can help to stabilize the coating process so as to eliminate as much as possible the formation of deposits and crystallites at the less hot surfaces of the system due to temperatures above 40° C. Therefore, it is advantageous to select the distance of elements and walls of the system from the spray nozzle such that the temperatures of these elements and walls are not subject to temperatures above 40° C. in order to prevent the formation of deposits and crystallites in the systems as much as possible.

Compared to immersion, the concentrations of the aqueous composition for spraying can be comparatively high due to the necessary reactivity at short coating times. Unless high-temperature substrates, for example freshly hot galvanized steel plates, are to be coated in the cooling phase, it is preferable for the substrates to be heated prior to coating to temperatures of preferably more than 100° C., in particular more than 180° C., more than 220° C. or more than 260° C. In quite a number of embodiment variations, however, zinc oxide can occur in small amounts, such as less than 100 or less than 50 nm in average length of the ZnO crystals and alternatively with a crystal formation that is not as good, in particular when only incomplete oxidation of the zinc compounds is possible.

B) Flooding:

Coating with an aqueous composition by flooding, it being preferable for substantially at least one liquid stream to be used for application and to strike the metallic surface at at least one point so that the aqueous composition flows from there over the rest of the metallic surface after the striking thereof. Alternatively, in addition to the at least one liquid stream, droplets can occur when the flooding is applied, the droplets being of larger or smaller size. The advantages of flooding, in particular in comparison with spraying, are the ability to largely avoid spray misting and/or aerosols as well as being a simpler and more robust application technique. Also, in a strip or coil and/or in a continuous facility, the application can be done in at least one liquid stream that is designed as at least one liquid curtain. After the liquid composition hits the metallic surface, the optionally excess composition can squeezed down to a specific liquid film thickness.

In flooding, it is preferable to work with initial substrate temperatures in the range from 100 to 400° C., it being possible to achieve substrate temperatures in the range from 400 to 5° C. during and/or after contacting with the aqueous composition by cooling the substrate. However, substrate temperatures below 50° C. are very undesirable. What is especially preferred is to work at a temperature and/or initial temperature of the composition in the range from 5 to 98° C.

It is especially preferred to work at an aqueous composition temperature in the range from 12 to 95° C., 14 to 90° C., 16 to 80° C., 18 to 60° C. or 20 to 40° C. It is especially preferred to work at an initial substrate temperature in the range from 5 to 400° C., 20 to 320° C., 40 to 280° C., 60 to 240° C., 80 to 200° C. or 100 to 160° C.

In flooding, primarily or only fresh composition comes into contact with the metallic surface. Therefore, it is hardly possible, if at all, for chemical deposition to occur near the metallic surface in comparison to immersion. Therefore, there is also high reactivity associated with flooding. Comparatively short treatment times can be used. In flooding, especially at high temperatures of the metallic surface, for example on a freshly hot-galvanized metallic surface high reactivity and comparatively short treatment times can be achieved. This method can also be modified in such a way as to make it suitable for coating rapidly moving strips or coils.

If at least one means for adjusting the pH and/or for stabilization 4.) is used for flooding, the total amount of this means is preferred to be in the range from 0.0001 to 60 g/L based on the respective compound added, especially preferably in the range from 0.001 to 40 g/L, 0.01 to 20 g/L, 0.1 to 15 g/L, 0.5 to 10 g/L, 1 to 8 g/L or 2 to 6 g/L of the added compounds.

During flooding, especially short coating times can also be selected such that even fast moving strips or coils can be coated. Usually, even nanocrystalline zinc oxide coatings are achieved on freshly galvanized or freshly cleaned metallic surfaces. Therefore it is not absolutely necessary to perform an alkaline cleaning beforehand, for example. At the substrate and aqueous composition temperatures, there is quite a large freedom with many manufacturing variants. In flooding, the composition of the nanocrystalline zinc oxide coating can usually be better adjusted and controlled than in immersion. Also, this method is often more environmentally friendly since precipitation and foam are very infrequent due to the short contact times, which helps to avoid aerosol formation as is the case with spraying.

In flooding or spraying, there is often no diffusion layer, or a very thin layer, that forms on the metallic surface due to the continuous replenishment of the composition and due to the immediate formation of the nanocrystalline zinc oxide coating. On the other hand, in immersion a distinct diffusion layer can possibly form on the metallic surface which is only overcome through chemical reaction by means of a very high aqueous composition concentration before zinc oxide crystals can grow. Therefore, in comparison to immersion and for this case in particular, the composition concentrations can be lower during flooding or spraying. On the other hand, situations can arise in which the concentration of the aqueous composition is selected to be higher during flooding or spraying than during immersion. If the substrates to be coated are not high-temperature substrates, such as freshly hot-galvanized steel plates, for example, it is preferable for the substrates to be heated prior to coating to temperatures of preferably more than 100° C., in particular more than 180° C., more than 220° C. or more than 260° C. Suitable temperatures and/or initial temperatures of the aqueous composition during coating are in particular 5 to 98° C., 8 to 60° C., 10 to 40° C. or 12 to 32° C.

The aqueous composition can be alternatively held in a slightly or a very movable state during flooding. However, in many variants, the zinc oxide that occurs can be of smaller size and poor crystal formation.

C) Immersion:

Coating by way of immersion is preferred to be done in a bath of the composition according to the invention, the bath having an initial bath temperature in the range from 40 to 98° C. at initial dipping of a substrate or during longer or continuous operation, in particular after at least one initial quenching step. Particularly high-quality coatings can be achieved at relatively long contact times. It is especially preferred in immersion to work at an initial temperature of the bath composition upon initial dipping of the substrate to be in the range from 45 to 95° C., 50 to 90° C., 55 to 85° C., 60 to 80° C. or 65 to 75° C. The initial substrate temperature can basically be in the range from about 5 to 400° C., preferably in the range from 10 to 98° C., 15 to 90° C., 18 to 80° C., 20 to 60° C. or 22 to 40° C., or in rare cases even in the range from 30 to 80° C. or 40 to 60° C. The aqueous composition can be moved slightly or vigorously during immersion—by way of dipping, removal and/or forced bath movement.

For purposes of immersion, the amount of zinc-containing compounds 2.a) is especially preferred to lie in the range from 0.001 to 100 g/L, 0.01 to 80 g/L, 0.1 to 40 g/L, 0.3 to 20 g/L, 0.5 to 12 g/L, 0.8 to 8 g/L or 1 to 3 g/L of the added and/or contained zinc-containing compounds calculated as elemental zinc.

As an alternative to zinc-containing compounds 2.a), a zinc-free composition 2.b) can be used to dissolve zinc from a zinc-containing metallic surface. For immersion purposes, the amount of the corresponding zinc-free compounds 2.b) for dissolving zinc from a zinc-containing metallic surface is especially preferred to lie in the range from 0.001 to 300 g/L, 0.01 to 240 g/L, 0.1 to 120 g/L, 0.3 to 60 g/L, 0.5 to 40 g/L, 0.8 to 25 g/L or 1 to 10 g/L of the added and/or contained zinc-free compounds calculated as the respective compounds.

For purposes of immersion, the total amount of all binders can be in the range from 0.001 to 10 g/L based on the respective compounds added and/or contained. It is especially preferred for the total amount of all binders to lie in the range from 0.01 to 8 g/L, 0.02 to 6 g/L, 0.05 to 4 g/L, 0.08 to 1.5 g/L or 0.1 to 0.5 g/L of the compounds added and/or contained.

The coating thickness of a crystalline zinc oxide coating produced by way of immersion depends on the immersion time, the temperature and the concentration of the composition, in particular.

The coatings can have very good zinc oxide crystal formation, in particular when longer coating times are selected. It is assumed that when applied by way of immersion, the zinc oxide crystals have fewer defects and/or possibly can withstand corrosive attack longer when the crystals, particles and/or coatings are grown more slowly than in flooding or spraying. Nevertheless, contaminants that accumulate in the bath and/or are entrained into same, as well as amounts of dopants and/or zinc can have an effect. The coating times usually vary in contact time within the range from 5 seconds to 3 days or from 10 seconds and 2 days or 1 minute to 2 days. The times are preferred to lie in the range from 10 minutes to 36 hours, in the range from 12 minutes to 24 hours, in the range from 15 minutes to 16 hours, in the range from 20 minutes to 12 hours, in the range from 30 minutes to 8 hours, in the range from 40 minutes to 6 hours, in the range from 50 minutes to 4 hours or in the range from 1 to 2 hours. Particularly good coatings can many times be achieved after contact times in the range from just 20 to 50 minutes, in particular when no quenching is done. When the substrates are quenched, the coating time can be kept within the range from 1 to 300 seconds or 1 to 30 seconds in particular. When the substrates are quenched in the immersion process, it is preferable to work in the range from 100 to 500° C. or 250 to 400° C. for an initial substrate temperature. Especially good coatings with a thick surface coverage can be achieved if the initial substrate temperature is from 200 to 400° C. If the substrates are quenched, the crystals are often times in the form of platelets.

Compared to flooding or spraying, the concentration is often lower due to the longer coating times, in particular when no quenching is done. Especially even nanocrystalline zinc oxide coatings are achieved on freshly cleaned metallic surfaces. Good coatings can also result on oxidized zinc surfaces. Therefore it is not absolutely necessary to perform an alkaline cleaning beforehand, for example. There is a large degree of freedom in the temperatures of the aqueous composition: The temperature of the substrates to be coated can be freely selected and it is often sufficient to select a substrate temperature in the range from 5 to 40° C., even if higher temperatures could be advantageous. On the other hand, it is usually advantageous to work with a bath temperature of 120 to 400° C.—provided that the substrate material is not damaged, in the range from 45 to 99° C. or 60 to 98° C., and especially preferably at 80 to 95° C., in particular for long-term coating periods. This method sometimes results in the composition of the nanocrystalline zinc oxide coatings being less easily adjusted and controlled than in spraying or flooding.

The aqueous composition can optionally be held in a slightly or a very movable state during immersion. In many embodiments, however, zinc oxide crystals of smaller size and poorer crystallinity can occur, in particular in baths at lower temperatures. Because of the longer contact times, increased precipitation and/or foaming can occur.

Finally, in an especially preferred embodiment, coating methods according to the invention can be re-applied in that after a first forming of a nanocrystalline zinc oxide coating a re-treatment of the coated substrate is done by way of flooding, spraying or immersion using an aqueous composition. This can achieve a thicker, possibly even a better-crystallized nanocrystalline zinc oxide coating and a much higher level of corrosion protection.

Surprising Effects and Advantages

As a whole, it was surprising that well-crystallized and homogeneous nanocrystalline zinc oxide coatings can be achieved in a relatively easy way. The aqueous compositions were easily stabilized with just a few additives. Also, it is possible to adjust and control processing conditions and compositions in a very precise way. The range from variations of aqueous compositions and of the compositions of the coatings is gratifyingly large and offers a multitude of options for corrosion-resistant coatings.

It was surprising that the nanocrystalline zinc oxide coatings also exhibit a high paint adhesive ability for subsequently applied coatings.

It was surprising that the nanocrystalline zinc oxide coatings can be easily produced even under industrially useful conditions.

It was surprising that particularly high-quality coatings could be produced very quickly using waste heat, for example from hot zinc surfaces in an energetically beneficial process. The conditions of freshly galvanized steel strip can be simulated.

It was also surprising that coatings produced by quenching the substrates were quite different from and better than those produced without quenching under the same contact time and were also easier to control.

It is particularly advantageous when the metallic surface of the substrate has a temperature of greater than 120° C. and if the substrate is quenched in contact with the aqueous composition since this permits particularly dense and corrosion-resistant coatings to be produced in this way.

It is advantageous that by adapting the coating method for existing strip plants an environmentally friendly alternative to prior art coating methods is made possible, the alternative utilizing waste heat from existing processes, such as a hot-galvanization process, thereby requiring less energy input, or even none at all. Many processing steps can be replaced.

It is advantageous that non-homogeneous alloy surfaces, or ill-suited metallic surfaces can be converted to homogeneous oxide surfaces fast and easily by way of coating using the nanocrystalline zinc oxide coatings according to the invention, which can then be further processed as necessary. Because non-homogeneous alloy surfaces, or steel surfaces in many applications, for example, can present particular problems in industrial corrosion protection.

The substrates coated according to the invention, with coated metallic surfaces, can be used in vehicle construction, as architectural elements in construction, or in the manufacture of equipment and machines such as electronic devices or household devices.

The nanocrystalline zinc oxide coatings according to the invention can be used as corrosion-resistant coatings and/or coatings that increase paint adhesion, in particular on zinc-containing metallic surfaces.

EXAMPLES AND COMPARISONS

The examples (B) and comparative examples (VB) described below are intended to explain the object of the invention in more detail.

Aqueous compositions were prepared by mixing, the compositions of which are indicated in Tables 1 as bath compositions.

Compositions were prepared with amounts of 40 g/L of zinc acetate dihydrate for flooding or spraying, 4 g/L of zinc acetate dihydrate for spraying and 15 g/L zinc nitrate hexahydrate for immersion, each of which was based on the compound used as a zinc source, respectively. The resultant amounts of dissolved zinc were 11.7 g/L and for immersion 3.2 g/L. For examples B2 to B7, B10 to B15, B18 to B23, B31 and B32, the dopants added included aluminum acetate, calcium dihydrogenphosphate, cerium acetate monohydrate or magnesium acetate tetrahydrate for flooding or spraying, cerium nitrate hexahydrate or magnesium nitrate hexahydrate for immersion and nickel acetate tetrahydrate or zirconium acetate hydroxide for spraying. The mole ratio of the amount of zinc to the doping element cerium, magnesium or phosphorus was set to a Zn:doping elements Al, Ce, Mg and/or P ratio of 25:1, only the phosphorus amount being set as such when calcium dihydrogenphosphate was added. For example, when calcium dihydrogenphosphate was added, calcium and phosphorus are both considered doping elements. Also, silane or an alkali silicate soluble glass was added to some samples.

The best blank corrosion protection results were observed when nickel, for example as acetate, and when zirconium, for example as acetate, were added.

Square sections of hot-galvanized plate (HDG) of 10×20 cm in size were used as the metallic substrates for flooding or spraying, which were cleaned in a multi-staged solvent purification process: For the coating by flooding or spraying, the plate sections were first dipped into an ultrasonic bath of THF, then in an ultrasonic bath of isopropanol and finally in an ultrasonic bath of ethanol. For the immersion coating of plate sections of size 1×4 cm made of 99.99% pure zinc made by the company Alfa Aesar, the plate sections were polished down to a grain size of 2500 mesh and then cleaned by dipping in ethanol in the ultrasonic bath.

When applied in the flooding or spraying methods, the aqueous solutions had an initial bath temperature of about 22° C., and when applied in the immersion method the temperature was about 90° C. The prepared solution was sprayed onto hot-galvanized steel in the flooding or spraying methods, and the steel had an initial substrate temperature in the range from 200 to 320° C. This caused the water content to spontaneously evaporate. A zinc oxide coating spontaneously formed as a result of the oxidation of the zinc salts.

During the spraying of the aqueous compositions onto hot substrates, such as hot-galvanized steel for example, at a substrate temperature in the range from 250 to 350° C., for example, and at a temperature of the aqueous composition in the range from 20 to 30° C., vigorous quenching of the metallic substrates occurred. The higher the difference of the substrate temperature to the temperature of the aqueous composition, the more pronounced and good was the formed, wide-coverage zinc oxide coating and the better the blank corrosion protection. Of course, the substrate temperature is more important than the temperature of the aqueous zinc salt solution.

For immersion, an initial bath temperature of about 90° C. was used at an initial substrate temperature of about 22° C. During immersion, ultrafine particles formed from the dopant under these conditions in Example 10, probably from cerium oxide which got between the columnar ZnO crystals (see FIG. 7). In many examples that made use of a dopant, doped coatings were produced in which individual dopants were incorporated into the mixed zinc oxide matrix. Scanning electron microscopic images and Raman spectroscopic measurements show that the ZnO crystals have similar crystal morphologies independent of the dopant, and clearly have approximately similar degrees of crystallinity of the zinc oxide. All samples according to the invention showed strong crystallinity of the zinc oxide here.

During the subsequent coating of the substrates coated with a nanocrystalline zinc oxide coating according to the invention, a clearly improved corrosion protection was seen and a very clearly improved paint adhesion strength. These coatings improved the corrosion resistance and paint adhesion in this way, for example using a coating based on polyacrylic acid, a nitrogen-containing silane, a phosphonate and/or a biphosphonate on a nanocrystalline zinc oxide coating according to the invention.

For examination of corrosion resistance, the uncoated samples and the samples coated according to the invention were coated with a layer made of epoxide-based adhesive D.E.R 331 P by Dow Chemical with a Jeffamine® D400 curing agent by Huntsman at a weight ratio of 1.64:1. This simulates a paint coating. To prepare this coating, hot-galvanized steel plate of 1.50×4.00 cm in size was carefully adhered together overlapping along two parallel short edges using a strip of adhesive. Adhesion was provided on 7.00 mm on the top side of the steel plate at the edge of the short side, and at the same time the short side surfaces were adhered, a height of the adhesive strip package of 0.12 mm thickness being formed on the top side. Then, the top, un-adhered side of the steel sheet was coated with the prepared epoxide-based adhesive at a thickness of 0.12 mm. A PTFE block with a large flat surface and that was encased in aluminum foil as a counter-surface for the curing of the epoxide-based adhesive, the sample being clamped to the encased Teflon block. After curing at 120° C. for 75 minutes, the block, the aluminum foil and the adhesive strips were removed from the epoxide coating and the substrate. The epoxide coating then had a coating thickness of 0.12 mm. A paint coating was produced in this way to investigate the corrosion resistance and paint adhesion strength of painted metallic substrates.

For the characterization of corrosion resistance, electrochemical corrosion current density measurements were performed on unpainted substrates as well as tests using a specific laboratory method for corrosion testing or accelerated corrosion testing at elevated temperature in painted substrates.

Measurements of Corrosion Current Density and of the Corrosion Potential:

For these measurements, a laboratory apparatus was used which included a potentiostat, 3 electrodes and PTFE cell. The unpainted samples were installed as working electrodes, whereas a silver/silver chloride electrode as a reference electrode was used, and a gold wire as a counter electrode. An aqueous solution with a pH of 8.4 was used as an electrolyte on the basis of 19.1 g/L of sodium tetraborate decahydrate, 12.4 g/L of boric acid and 7.1 g/L of sodium sulfate. The potential applied to the working electrode was varied in steps of 5 mV/s within the range from −0.2 V to +0.2 V—measured against a no-load output. The resulting current densities were recorded and plotted in current density-potential curves.

FIG. 1 shows the schematic of the test setup to the left for these measurements, whereas to the right is the principle for calculating the corrosion current $i_{KORR}$, the corrosion current density and the corrosion potential $E_{KORR}$ in a bar chart. The values for $i_{KORR}$ and $E_{KORR}$ correspond to the y and x values of the intersection of the two tangents placed at the anodic and the cathodic branches of the current density potential curve. The measurement of the current density-potential curves was done at 25° C. The total current density-potential curves measured are each made up of a cathodic term (left arm) for oxygen reduction and an anodic term (right arm of the curves) for metal dissolution. The lower the current densities, the lower the corrosion activity of a surface. For the evaluation of anodic and cathodic protection, the anodic and cathodic current densities of the samples coated according to the invention are compared to an uncoated sample.

Figure 2:
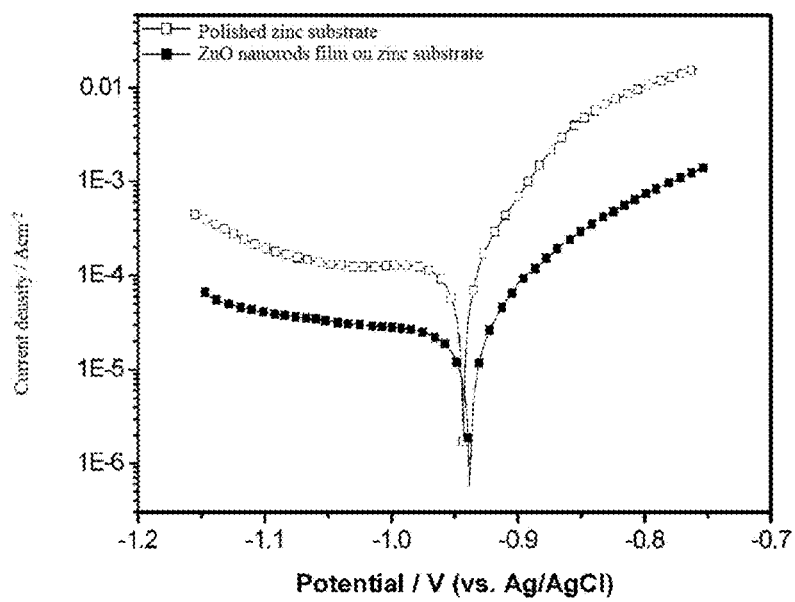
FIG. 2 is a graph of the results of the test setup shown in FIG. 1 at a zinc substrate coated with a ZnO layer of rod-shaped nanocrystals.

FIG. 2 shows the results of these measurements at a zinc substrate coated with a ZnO layer of rod-shaped nanocrystals from Example B9 (■) in comparison to the uncoated zinc substrate of comparative example VB16 (□). The decrease in current density due to the ZnO layer is clearly visible. The lower the values of the current density, the better the corrosion resistance. It can be seen from the current density-potential curves in FIG. 2 that the values of the current density are considerably lower for the anodic and for the cathodic potentials due to the ZnO layer of rod-shaped nanocrystals.

The measurements of the corrosion current density gave values in the range from 0.6 to 9 µA/cm$^2$ for the zinc sheet coated with the ZnO coating according to the invention. The lower the measured values of the corrosion current density the better they are. These can be classified as good to excellent. In comparison to this, the uncoated reference samples gave values of about 15 µA/cm$^2$ (VB8) and even about 110 µA/cm$^2$ (VB16), which indicate a clear and very strong tendency toward corrosion.

Figure 3:
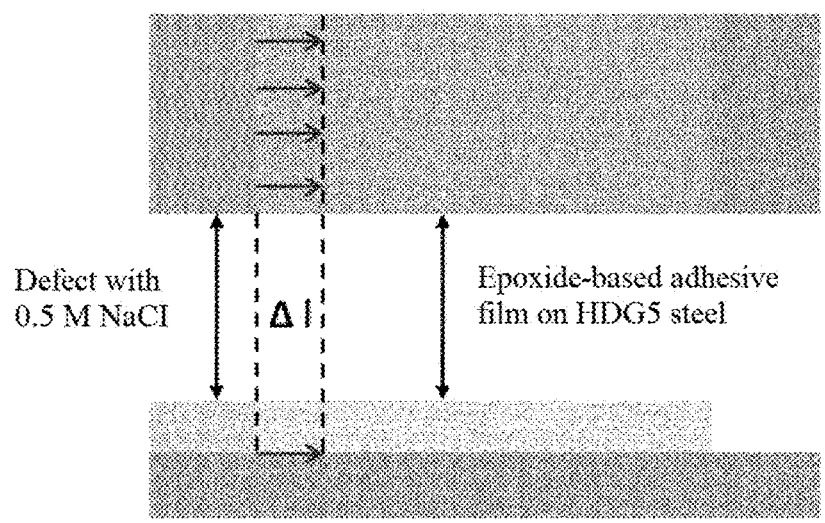
FIG. 3 is a schematic of an exemplary setup for corrosion and delamination tests.

Corrosion Test at Room Temperature:

FIG. 3 shows a diagram of the setup for the corrosion and delamination tests. Samples of 1.5×4.0 cm in size each were placed in a chamber in the presence of >98% relative humidity at a room temperature of 21±1° C. for one week. The corrosion front profile was observed from the beginning of the defect. After one week of testing, the lengths Δl of the corroded areas were measured on the samples. The shorter the corroded length Δl at the end of the testing period, the better the corrosion resistance.

For the corrosion test, the free edges of the hot-galvanized steel samples (HDG) which were coated partially with an epoxide-based adhesive according to FIG. 3, were treated with 0.5 M NaCl solution. This solution took effect over a week at 21° C. After this time, the lateral longitudinal extension Δl of the infiltrating corrosion front is determined.

The blank corrosion determination in the salt spray test was done on coated sheets of hot-galvanized steel in a salt spray chamber in the neutral salt spray test (NSS test) according to DIN EN ISO 9227. In the spray tests without optimization of the spray technique, a corrosion resistance of 5 days until less than 1% red rust is reached at a zinc oxide coating thickness of 0.025 µm.

Figure 4:
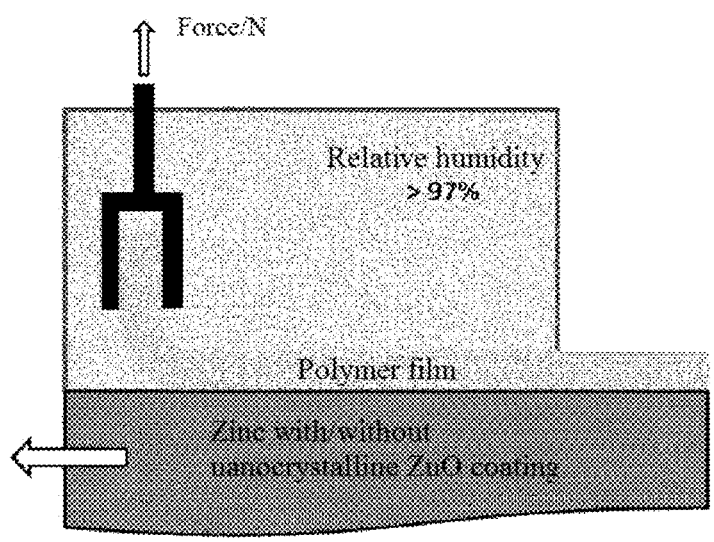
FIG. 4 is a schematic of an exemplary apparatus for a 90° peel test.

Paint Adhesion Measurements:

For the paint adhesion measurements, polished zinc sheet by Alfa Aesar with a 99.95% purity was used for the paint adhesion measurements, each sheet being 1×4 cm in size and having a grain size of up to 2500 mesh. The roughness of the zinc sheet surface was uniformly adjusted by polishing. Also, HDG sheets were used as a substrate, each being 1×4 cm in size. The substrates were optionally coated with nanocrystalline zinc oxide coatings according to the invention. The substrates were coated with an epoxide-based adhesive film for the corrosion tests. For the investigation of the wet-delamination, the samples were placed in a chamber in the presence of >97% relative humidity at 40° C. for one day. Thereafter, the adhesive film was peeled away from the samples beginning at the free metal edge by pulling the layer at right angles upward. The peeling force was recorded using a force sensor, model ZP-5 by Imada, Tokyo, Japan. FIG. 4 shows a diagram of the apparatus for the 90° peel test. The better the paint adhesion, the higher the measured value of the peeling force. The zinc sheets coated with the ZnO coating by immersion according to the invention showed peeling force values in the range from 2.7 to 3.5 N/cm. The HDG sheets coated with the ZnO coating by spraying according to the invention showed peeling force values in the range from 2.1 to 2.4 N/cm, whereas in all uncoated reference samples, values of 0.6 and 0.8 N/cm resulted. The samples coated according to the invention can be classified as good to very good in paint adhesion.

Figure 5:
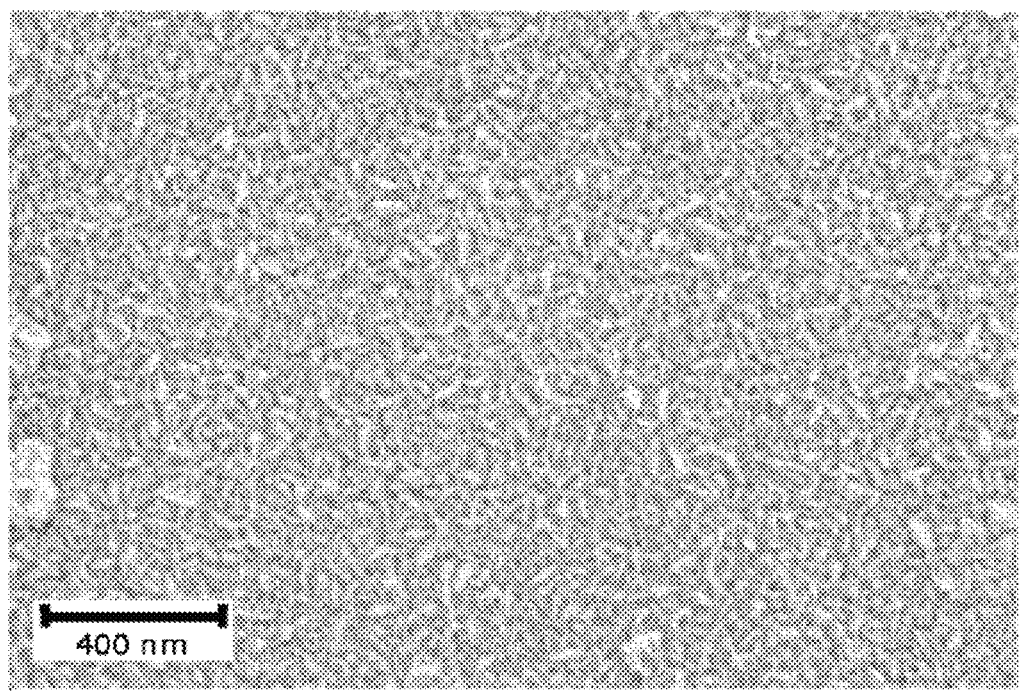
FIG. 5 is a scanning electron microscope image of an ultrafine crystalline zinc oxide coating manufactured through spraying.

FIG. 5 shows a scanning electron microscopic image of an ultrafine crystalline zinc oxide coating manufactured through spraying. It was produced at an initial substrate temperature of 290±4° C. and an initial temperature of the aqueous, 40 g/L zinc acetate dihydrate-containing solution of 22° C. by way of spraying with 20 mL/min and 2 bar for 30 s (Example B1).

Figure 6:
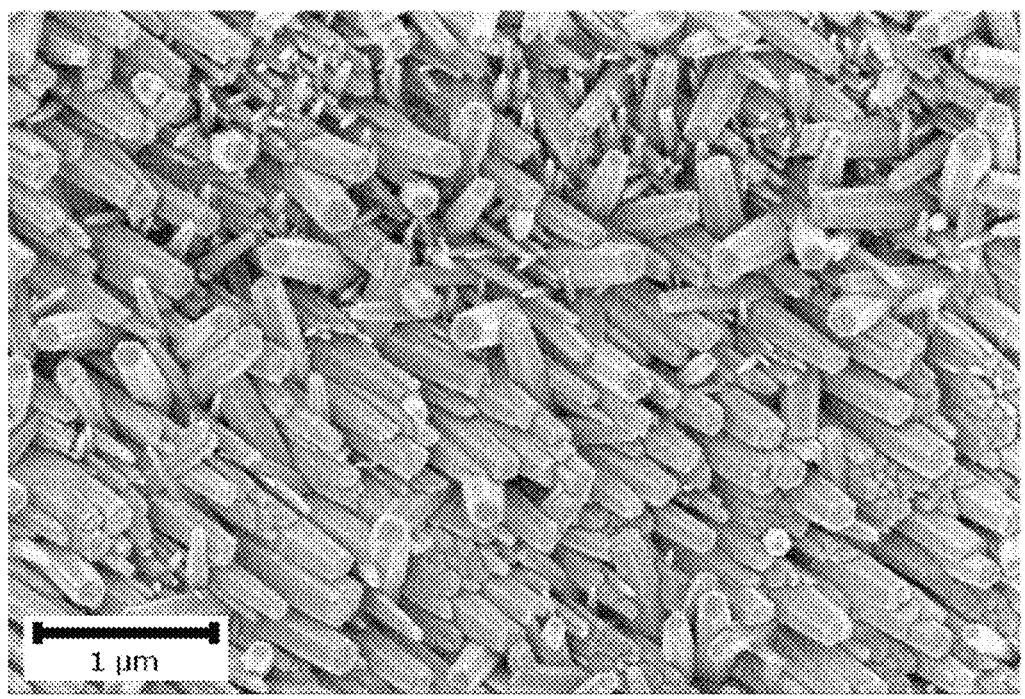
FIG. 6 is a scanning electron microscope image of a zinc oxide coating manufactured in an immersion process.

FIG. 6 shows a scanning electron microscopic image of a zinc oxide coating of Example B9 manufactured in an immersion process. It was produced at an initial bath temperature of 90±2° C. made up of an aqueous solution of 0.05 M of zinc nitrate hexahydrate and 0.05 M hexamethylene tetraamine for a coating time of 30 min.

FIG. 7 shows a scanning electron microscopic image of a Ce-doped zinc oxide coating of Example B10 manufactured in an immersion process. It was produced at an initial bath temperature of 90±2° C. made up of an aqueous solution of 0.05 M of zinc nitrate hexahydrate, 0.05 M hexamethylene tetraamine and 0.002 M cerium nitrate hexahydrate for a coating time of 30 min. In the scanning electron microscopic image, individual spherical particles can be seen in the darker color, possibly cerium oxide particles.

TABLE 1

Compositions and process steps for forming the zinc oxide coating and characteristics of the coatings produced therewith

| Example - Amounts in g/L | B1 | B2 | B3 | B4 | B5 | B6 | B7 | VB8 |
|---|---|---|---|---|---|---|---|---|
| Substrate | HDG | | | | | | | |
| Cleaning method | Solvent cleaning immersed in ultrasonic bath: THF, then isopropanol, finally ethanol | | | | | | | |
| ZnO production process | Spraying the aqueous composition at about 22° C. onto the substrate at 280-320° C. (initial conditions) | | | | | | | — |
| Zn salt | Zinc acetate dihydrate $Zn(O_2CCH_3)_2(H_2O)_2$ | | | | | | | — |
| Amount of Zn salt in g/L | 11.7 g/L based on the Zn amount | | | | | | | — |
| Dopant acetate unless otherwise specified | — | Ce | Mg | $Ca(H_2PO_4)_2$ | $Ca(H_2PO_4)_2$ | $Ca(H_2PO_4)_2$ | Al | — |
| Dopant ratio: Zn salt | — | 1:25 | 1:25 | 1:25 | 1.10 | 1:25 | 1:25 | — |
| Mole ratio APS: Zn salt | — | — | — | — | — | 1:25 | — | — |
| pH | 6.5 | 6.5 | 6.5 | 6.5 | 6.5 | 6.5 | 6.5 | — |

TABLE 1-continued

Compositions and process steps for forming the zinc oxide coating and characteristics of the coatings produced therewith

| | | | | | | | | |
|---|---|---|---|---|---|---|---|---|
| Contact time in sec | 30 | 30 | 30 | 30 | 30 | 30 | 30 | — |
| Approximate thickness of ZnO coating in μm | 0.025 | 0.025 | 0.025 | 0.025 | 0.025 | 0.035 | 0.025 | Uncoated |
| Coating quality | Even, wide-coverage | | | | | | | |
| ZnO crystal morphology | Platelets, similar to a house-of-cards structure, closed on metal surface | | | | | | | — |
| Another phase visible in the SEM? | no | no | no | no | no | no | no | — |
| 2.a epoxide adhesive: | | | | | | | | |
| Paint coating thickness in μm | colspan="7" 120 | | | | | | | |
| Coating quality | good | good | good | good | good | good | good | — |
| A) Corrosion protection at RT: | | | | | | | | |
| Blank corrosion salt spray test 120 h | <5% red rust | <5% red rust * | <5% red rust * | <5% red rust * | <5% red rust * | <5% red rust * | <2% red rust | >10% red rust |
| Corrosion current density μA/cm² | 1.23 | 1.80 | 0.55 | 0.60 | — | — | 1.6 | 15.20 |
| Corrosion voltage in V | −0.84 | −0.89 | −0.56 | −0.59 | — | — | −0.78 | −0.87 |
| Gradual evaluation A) | very good | very good | very good | very good | — | — | very good | poor |
| Anodic inhibition compared to uncoated sample | yes | yes | yes | yes | — | — | yes | poor |
| Cathodic inhibition compared to uncoated sample | yes | yes | yes | yes | — | — | yes | poor |
| Corrosion front in mm after one week | 1.9 | 2.1 | 1.7 | 1.6 | — | — | — | 3.7 |
| B) Paint adhesion: | | | | | | | | |
| Peeling force in N/cm | 2.2 | 2.1 | 2.1 | 2.4 | — | — | — | 0.6 |

* or even <2% red rust

| Example | B9 | B10 | B11 | B12 | B13 | B14 | B15 | VB16 |
|---|---|---|---|---|---|---|---|---|
| Substrate | Zinc 99.95% | | | | | | | |
| Cleaning method | Polished down to 2500 mesh grain size, thereafter cleaned by dipping in ethanol in an ultrasonic bath, | | | | | | | |
| ZnO production process: | Immersion of the substrate of about 22° C. into aqueous composition of about 90° C. (initial conditions) | | | | | | | — |
| Zn salt and amine | Zinc nitrate hexahydrate Zn(NO₃)₂•6H₂O and hexamethylenetetraamine | | | | | | | |
| Amount of Zn salt in g/L | colspan="7" 3.25 g/L based on the Zn amount | | | | | | | |
| Dopant acetate/nitrate (Ac and NO3) | — | Ce(NO₃)₃•6H₂O | Mg(NO₃)₂•6H₂O | Ca(H₂PO₄)₂ | Ce Ac | Mg(CH₃COO)₂•4H₂O | Al Ac | — |
| Dopant ratio: Zn salt | — | 1:25 | 1:25 | 1:25 | 1:25 | 1:25 | 1:25 | |
| Mole ratio TEOS: Zn salt | — | — | — | — | — | — | 1:25 | |
| pH | 6.5 | 6.5 | 6.5 | 6.5 | 6.5 | 6.5 | 6.5 | — |
| Contact time in min | 30 | 30 | 30 | 30 | 30 | 30 | 30 | — |
| Approximate thickness of ZnO coating in μm | 0.4 | 0.4 | 0.4 | 0.4 | 0.4 | 0.4 | 0.4 | — |
| Coating quality | even, wide-coverage | | | | | | | — |
| ZnO crystal/coating formation | columnar-pegs, substantially parallel growth, largely closed on the metal | | | | | | | — |
| Another phase visible in the SEM? | no | yes | no | no | no | no | no | — |
| 2.a Epoxide adhesive: | Paint coating thickness 120 μm | | | | | | | |
| Coating quality | good | good | good | good | — | — | — | — |
| A) Corrosion protection at RT: | | | | | | | | |
| Corrosion current density in μA/cm² | 6.65 | 8.85 | 7.94 | 6.64 | — | — | — | 112 |
| Corrosion voltage in V | −0.91 | −0.77 | −0.90 | −0.66 | — | — | — | −0.94 |
| Gradual evaluation A) | very good | very good | very good | very good | — | — | — | poor |
| Anodic inhibition compared to uncoated sample | yes | yes | yes | yes | — | — | — | poor |
| Cathodic inhibition compared to uncoated sample | yes | yes | yes | yes | — | — | — | poor |
| Corrosion front in mm after one week | 2.7 | 2.2 | 2.3 | 1.9 | — | — | — | 4.1 |
| B) Paint adhesion: | | | | | | | | |
| Peeling force in N/cm | 2.7 | 2.9 | 2.9 | 3.5 | — | — | — | 0.8 |

| Example - Amounts in g/L | B17 | B18 | B19 | B20 | B21 | B22 | B23 | VB24 |
|---|---|---|---|---|---|---|---|---|
| Substrate | HDG | | | | | | | |
| Cleaning method | Solvent cleaning immersed in ultrasonic bath: THF, then isopropanol, finally ethanol | | | | | | | |
| ZnO production process | Flooding the aqueous composition at about 22° C. onto the substrate at 280320° C. (initial conditions) | | | | | | | — |
| Zn salt | Zinc acetate dihydrate Zn(O2CCH3)2(H2O) 211.7 g/L based on the zinc content | | | | | | | |
| Dopant acetate unless otherwise specified | — | Ce | Mg | Ca(H₂PO₄)₂ | Ca(H₂PO₄)₂ | Ca(H₂PO₄)₂ | Al | — |
| Dopant ratio: Zn salt | — | 1:25 | 1:25 | 1:25 | 1.10 | 1:25 | 1:25 | |
| Mole ratio Na silicate: Zn salt | — | — | — | — | — | 1:25 | — | |
| pH | 6.5 | 6.5 | 6.5 | 6.5 | 6.5 | 6.5 | 6.5 | — |

TABLE 1-continued

Compositions and process steps for forming the zinc oxide coating and characteristics of the coatings produced therewith

| | | | | | | | | |
|---|---|---|---|---|---|---|---|---|
| Contact time in sec | 30 | 30 | 30 | 30 | 30 | 30 | 30 | — |
| Approximate thickness of ZnO coating in μm | 0.05 | 0.05 | 0.05 | 0.05 | 0.05 | 0.07 | 0.05 | uncoated |
| Coating quality | even, wide-coverage | | | | | | | |
| ZnO crystal morphology | partially platelets | | | | | | | — |
| Another phase visible in the SEM? | no | no | no | no | no | no | no | — |
| 2.a Epoxide adhesive: | Paint coating thickness 120 μm | | | | | | | |
| Coating quality | good | good | good | good | good | good | good | good |

| Example | B25 | B26 | B27 | B28 | B29 | B30 | B31 | B32 |
|---|---|---|---|---|---|---|---|---|
| Substrate | HDG | | | | | | | |
| Init. substrate temperature in °C. | 200 | 250 | 300 | 200 | 250 | 300 | 280-320 | 280-320 |
| Cleaning method | Solvent cleaning immersed in ultrasonic bath: THF, then isopropanol, finally ethanol | | | | | | | |
| ZnO production process | Spraying the aqueous composition at initially about 22° C. onto hot substrate | | | | | | | |
| Zn salt | Zinc acetate dihydrate $Zn(O_2CCH_3)_2(H_2O)_2$ | | | | | | | |
| Amount of Zn salt in g/L based on the Zn amount | 11.7 | 11.7 | 11.7 | 1.17 | 1.17 | 1.17 | 11.7 | 11.7 |
| Dopant acetate | — | — | — | — | — | — | Ni | Zr |
| Mole ratio dopant: Zn salt | — | — | — | — | — | — | 1:25 | 1:25 |
| pH | 6.5 | 6.5 | 6.5 | 6.5 | 6.5 | 6.5 | 6.5 | 6.5 |
| Contact time in sec | 30 | 30 | 30 | 30 | 30 | 30 | 30 | 30 |
| Approximate thickness of ZnO coating in μm | 0.025 | 0.025 | 0.028 | 0.005 | 0.005 | 0.009 | 0.025 | 0.025 |
| Coating quality | inhomogeneous | even, wide coverage | even, wide coverage | inhomogeneous | inhomogeneous | even, no wide coverage | even, wide coverage | even, wide coverage |
| ZnO crystal morphology | platelets, if even layer | | | | | | | |
| Another phase visible in the SEM? | no | no | no | no | no | no | no | no |
| 2.a Epoxide adhesive: | Paint coating thickness 120 μm | | | | | | | |
| Coating quality | good | good | good | good | good | good | good | good |
| A) Corrosion protection at RT: | | | | | | | | |
| Blank corrosion salt spray test 120 h | — | — | — | — | — | — | <1% red rust | <1% red rust |
| Corrosion current density in μA/cm² | 11.4 | 4.4 | 1.8 | 11.6 | 10.7 | 8.4 | 1.35 | 0.67 |
| Corrosion voltage in V | −0.86 | −0.90 | −0.86 | −0.91 | −0.86 | −0.88 | −0.87 | −0.77 |
| Gradual evaluation A) | good | very good | very good | good | good | good | very good | very good |
| Anodic inhibition compared to uncoated sample | yes | yes | yes | yes | yes | yes | yes | yes |
| Cathodic inhibition compared to uncoated sample | no | no | yes | no | no | no | yes | yes |

| Example - Amounts in g/L | B33 | B34 | B35 | B36 | B37 | B38 | VB39 | B40 |
|---|---|---|---|---|---|---|---|---|
| Substrate | Zinc 99.95% | | | | | | | |
| Init. substrate temperature in °C. | 200 | 250 | 300 | 200 | 250 | 300 | 25 | 250 |
| Cleaning method | Polished down to 2500 mesh grain size, thereafter cleaned by dipping in ethanol in an ultrasonic bath, | | | | | | | |
| ZnO production process: | Immersion of the substrate into aqueous composition of initially about 25° C. | | | | | | | |
| Zn salt | Zinc acetate dihydrate $Zn(O_2CCH_3)_2 \cdot (H_2O)_2$ | | | | | | | |
| Amount of Zn salt in g/L | 11.7 g/L based on the Zn amount | | | | | | | |
| Amount of polyacrylic acid in g/L | — | — | — | — | — | — | — | 0.5 |
| pH | 6.5 | 6.5 | 6.5 | 6.5 | 6.5 | 6.5 | 6.5 | 6.5 |
| Contact time in sec. approximate | 5 | 5 | 5 | 30 | 30 | 30 | 30 | 5 |
| Approximate thickness of ZnO coating in μm | 0.010 | 0.010 | 0.020 | 0.015 | 0.020 | 0.050 | — | 0.020 |
| Coating quality | inhomogeneous | inhomogeneous, wide coverage | even, wide coverage | inhomogeneous | inhomogeneous | inhomogeneous | almost no coating | inhomogeneous, wide coverage |
| ZnO crystal/coating formation | platelets, if even coating; at coating time of 30 s possible organometallic layer on the ZnO | | | | | | | |
| Another phase visible in the SEM? | — | — | no | — | — | — | — | no |
| A) Corrosion protection at RT: | | | | | | | | |
| Corrosion current density in μA/cm² | — | 21.6 | 11.0 | — | — | — | — | — |
| Corrosion voltage in V | — | −0.88 | −0.92 | — | — | — | — | — |
| Gradual evaluation A) | — | very good | very good | — | — | — | — | — |

TABLE 1-continued

Compositions and process steps for forming the zinc oxide coating and characteristics of the coatings produced therewith

| | | | | | | | | |
|---|---|---|---|---|---|---|---|---|
| Anodic inhibition compared to uncoated sample | — | yes* | yes | — | — | — | — | — |
| Cathodic inhibition compared to uncoated sample | — | yes* | yes | — | — | — | — | — |

*no reliable measurements

Samples VB8, VB16 and VB24 were not coated and also not wetted with water, and sample VB8 was also heated to 280-320° C. for comparison so that a comparison of the uncoated zinc-rich substrates can be made with substrates coated according to the invention in samples B1 to B7, B32 and B33 for spraying, B9 to B15 for immersion and B17 to B23 for flooding. The series of samples below show variations in quenching for spraying and immersion, sample VB38 being almost uncoated since the substrate and the aqueous zinc salt solution showed a temperature of 25° C. and since the pH is nearly neutral. If a temperature range from 280-320° C. is indicated for a substrate, a temperature gradient was used.

The composition of the aqueous solutions was varied using the indicated dopants, with the mole ratios indicated in the table. In Sample B6, additional aminopropylethoxysilane (APS) was added, which is why the coating thickness is greater. In Sample B15, additional tetraethylorthosilicate=tetraethoxysilane (TEOS) was added, in Sample B22 additional sodium silicate and in B40 polyacrylic acid.

Of the types of application, the coatings using spraying or immersion proved to be best. When a relatively cool and, for example, room temperature substrate is immersed longer in a hot aqueous zinc salt solution, in particular for about 15 or 20 minutes, very well-formed coatings result with clear crystal morphologies of the crystalline zinc oxide (B9 to B15). When a hot substrate, for example with a substrate temperature in the range from 200 to 400° C., is dipped into an aqueous zinc salt solution, well-formed coatings result (B33 to B38, B40) after very short treatment times of 1 to 15 seconds, for example, and at high temperature differences between the substrate initial temperature and the bath initial temperature of 150 to 350° C. of temperature difference, for example, in particular at higher temperature differences. Quenching under immersion treatment is therefore excellently suited for industrial purposes. During spraying, good coatings result in particular at high initial substrate temperatures, and the coatings get better as the temperature increases up to 300 or 320° C. (B25 to B30). Because of the short treatment times during spraying, good options become available for utilizing this treatment method industrially. Care must be taken during spraying that the temperature distribution and the treatment with spray liquid is done very evenly in order to achieve good coatings. The salt spray results in the blank corrosion protection test can be still be considerably improved through further optimization of the spraying technique, but are already now sufficient for initial industrial applications. The platelet-shaped zinc oxide crystals frequently had an average crystal size of about 5 to 20 nm in the quenching tests.

The corrosion protection at room temperature was determined according to the methods described above. In the determination of the corrosion front, the initial effect of blank corrosion and then a transition stage to infiltration under the polymer layer is detected. The blank corrosion is determined in the remaining determination methods.

In the electrochemical measurements A), it was shown that the nanocrystalline ZnO coatings of Examples B1 to B4 and B9 to B12 produced by spraying, immersion or flooding cause a significant improvement of the corrosion properties both in cathodic and in anodic polarization. The addition of cerium, phosphorus or magnesium-containing dopants provided especially high-quality corrosion protecting coatings.

Since the corrosion protection increases significantly with the thickness of a corrosion protection coating, the corrosion protection of the nanocrystalline zinc oxide coatings can be viewed as extraordinarily high for a coating thickness of about 0.025 μm. This is because zinc phosphate coatings typically exhibit coating thicknesses of about 2.5 to 3 μm in comparison herewith.

The coatings produced by spraying or immersion of Examples B1 to B4 and B9 to B12 even resulted in an about 15 to 20 times lowering of the corrosion currents at the corrosion current density measurements. They achieved a more than three-fold increase in the adhesion in the peel tests. The corrosion current density measurements clarify the rates of anodic and cathodic corrosion reactions.

The values of the corrosion current density measurements for zinc phosphate coatings, which can be correlated to the zinc oxide coatings according to the invention as industrially-common corrosion protection coatings, often lie in the range from 1 to 20 μA/cm² according to the scientific literature. The lower the values, the better they are. They depend on the coating time, the lowering of the corrosion current density being caused by strong inhibition of the cathodic reactions for short coating times of 15 seconds for zinc phosphate coatings, for example. This indicates a zinc phosphate coating that is still not sufficiently closed, whereas the zinc oxide coatings according to the invention point to closed zinc oxide coatings by comparison according to the corrosion current density measurements, which are high-quality coatings in this regard.

Also, the coatings according to the invention showed a more than threefold increase in paint adhesion B), possibly due to the enlarged surface and the surface structure of the ZnO coating and possibly also due to the improved surface chemistry. The paint adhesion can be assessed as good or very good according to the measurements.

In the SEM images of the coating of the sample of Example B10 produced by immersion, spherical cerium oxide particles can be seen as individual particles between the elongated zinc oxide crystals in the coating. An elemental analysis through energy-dispersive X-ray analysis, EDX, an atomic concentration of cerium of 1.34 At % was seen in the coating.

What is claimed is:

1. A method for coating a metallic surface of a substrate, the method comprising:
quenching the metallic surface of the substrate by contacting the metallic surface of the substrate having a first temperature with an aqueous composition having a second temperature thereby forming a corrosion-resistant nanocrystalline zinc oxide layer on the metallic surface of the substrate;
wherein the aqueous composition comprises an aqueous solution of a zinc salt and a dopant that is a water-soluble and/or alcohol-soluble compound of aluminum, barium, boron, calcium, carbon, cerium, iron, hafnium, cobalt, copper, lanthanum, lanthanide, magnesium, manganese, nickel, phosphorus, silicon, nitrogen, strontium, titanium, yttrium, and/or zirconium,
wherein the corrosion-resistant nanocrystalline zinc oxide layer comprises at least one hydroxide, oxide, and/or phosphate of aluminum, barium, boron, calcium, iron, hafnium, cobalt, copper, lanthanum, lanthanide, magnesium, manganese, nickel, phosphorus, silicon, nitrogen, strontium, titanium, yttrium, and/or zirconium, and
the nanocrystalline zinc oxide coating further comprises from 0.001 to 15 wt. % carbon,
wherein the metallic surface is contacted with the aqueous composition by way of flooding, spraying, and/or immersion,
wherein the first temperature is in the range from 120° C. to 400° C.,
wherein if the metallic surface of the substrate is contacted with the aqueous composition by way of flooding and/or spraying, then the second temperature is in the range from 5° C. to 98° C., and
wherein if the metallic surface of the substrate is contacted with the aqueous composition by way of immersion, then the second temperature is in the range from 40° C. to 98° C.

2. The method according to claim 1, wherein dopant is a water-soluble and/or alcohol-soluble compound of aluminum, barium, calcium, copper, at least one lanthanide, magnesium, manganese, nickel, titanium, and/or zirconium.

3. The method according to claim 1, wherein the aqueous composition has a ratio of zinc, calculated as metal, to dopant that is in the range from (a) 1:0.00001 to 1:2, (b) 1:0.0001 to 1:1.6, (c) 1:0.0001 to 1:1.2, (d) 1:0.0001 to 1:0.8, (e) 1:0.001 to 1:0.4, or (f) 1:0.03 to 1:0.1.

4. The method according to claim 1, wherein the aqueous composition has a pH value in the range from 2 to 13, and a content of zinc, calculated as metal, in the range from 0.001 to 100 g/L.

5. The method according to claim 1, wherein the aqueous composition contains at least one of a pH adjustment agent, an agent to stabilize the aqueous composition, at least one binder, and at least one additive.

6. The method according to claim 1, wherein the zinc salt is at least one zinc salt selected from the group of zinc acetate dihydrate, zinc acetylacetonate hydrate, zinc citrate dihydrate, zinc nitrate hexahydrate and zinc chloride.

7. The method according to claim 1, wherein the corrosion-resistant nanocrystalline zinc oxide layer has an amount of at least one corrosion inhibitor, at least one silane/silanol/siloxane/polysiloxane, at least one polysiloxane, at least one organic polymer/copolymer, at least one a silicate, and/or at least one additive.

8. The method according to claim 1, wherein if the metallic surface of the substrate is contacted with the aqueous composition by way of immersion, then the second temperature is in the range of from 40° C. to 98° C.

9. The method according to claim 1 further comprising:
after contacting the metallic surface of the substrate with the aqueous composition, squeezing down excess aqueous composition.

10. The method according to claim 1 further comprising:
applying a second coating of the aqueous composition to the metallic surface of the substrate having the corrosion-resistant nanocrystalline zinc oxide layer formed thereon, wherein the corrosion-resistant nanocrystalline zinc oxide layer is not dried or is incompletely dried, when the second coating of the aqueous composition is applied.

11. The method according to claim 1 further comprising:
coating the corrosion-resistant nanocrystalline zinc oxide layer on the metallic surface of the substrate, with or without subsequent rinsing with water, with another coating composition.

12. The method according to claim 1 further comprising:
after forming the corrosion-resistant nanocrystalline zinc oxide layer on the metallic surface of the substrate to form a coated substrate, retreating the coated substrate by contacting the coated substrate with the aqueous composition by way of flooding, spraying, and/or immersion.

13. The method according to claim 1 further comprising:
without drying or after drying, applying at least one further coating on the corrosion-resistant nanocrystalline zinc oxide layer, wherein the at least one further coating is based on at least one corrosion inhibitor, a phosphate, a phosphonate, a silane/silanol/siloxane/polysiloxane, a polysiloxane, a compound based on aluminum, barium, boron, calcium, iron, hafnium, cobalt, copper, lanthanum, lanthanide, magnesium, manganese, nickel, phosphorus, silicon, strontium, titanium, yttrium, zinc and/or zirconium, an organic polymer/copolymer and/or a silicate.

14. The method according to claim 1, wherein the dopant is selected from dopants containing cerium, phosphorus or magnesium.

15. A corrosion-resistant nanocrystalline zinc oxide layer produced by the method according to claim 1.

16. An article of manufacture comprising a corrosion-resistant nanocrystalline zinc oxide layer according to claim 1 thereon.

* * * * *